United States Patent
Xue et al.

(10) Patent No.: US 11,739,224 B2
(45) Date of Patent: Aug. 29, 2023

(54) WATER BASED PEELABLE PAINT FOR ARCHITECTURE COATINGS

(71) Applicant: BEHR PROCESS CORPORATION, Santa Ana, CA (US)

(72) Inventors: Chenming Xue, Laguna Beach, CA (US); Gregory A. Williams, Laguna Beach, CA (US); Mansi Sali, Jalgaon (IN); Dhanashree Havele, Pune (IN); Sujan Mandal, West Bengal (IN); China Ramanaiah Beeram, Maharashtra (IN); Claudia Paola Ramirez, Newport Beach, CA (US); Sadreddin Hosseini, Los Angeles, CA (US)

(73) Assignee: Behr Process Corporation, Santa Ana, CA (US)

( * ) Notice: Subject to any disclaimer, the term of this patent is extended or adjusted under 35 U.S.C. 154(b) by 728 days.

(21) Appl. No.: 16/774,231

(22) Filed: Jan. 28, 2020

(65) Prior Publication Data
US 2021/0230432 A1    Jul. 29, 2021

(51) Int. Cl.
| | |
|---|---|
| C09D 5/00 | (2006.01) |
| C08K 3/22 | (2006.01) |
| C08F 118/10 | (2006.01) |
| C08F 212/08 | (2006.01) |
| C08F 236/06 | (2006.01) |
| C08G 77/38 | (2006.01) |
| C08K 3/013 | (2018.01) |

(52) U.S. Cl.
CPC ............ *C09D 5/008* (2013.01); *C08F 118/10* (2013.01); *C08F 212/08* (2013.01); *C08F 236/06* (2013.01); *C08G 77/38* (2013.01); *C08K 3/013* (2018.01); *C08K 3/22* (2013.01); *C08K 2003/2237* (2013.01)

(58) Field of Classification Search
USPC .................................................. 524/506, 542
See application file for complete search history.

(56) References Cited

U.S. PATENT DOCUMENTS

| | | | |
|---|---|---|---|
| 6,124,044 A | 9/2000 | Swidler | |
| 6,713,522 B2 | 3/2004 | Zhang et al. | |
| 6,822,012 B1 | 11/2004 | Baumgart et al. | |
| 6,964,989 B1 | 11/2005 | Fang et al. | |

(Continued)

FOREIGN PATENT DOCUMENTS

| | | |
|---|---|---|
| CN | 102753641 A | 10/2012 |
| EP | 1 087 000 B1 | 2/2006 |

(Continued)

OTHER PUBLICATIONS

BYK-346 Technical Data Sheet, 2 pages, Issue Mar. 2017. (Year: 2017).*

(Continued)

*Primary Examiner* — Fred M Teskin
(74) *Attorney, Agent, or Firm* — Brooks Kushman P.C.

(57) ABSTRACT

A peelable paint composition for forming a peelable coating on a substrate is provided. The peelable paint composition includes water, a polysiloxane resin, and a film-forming resin that includes a component selected from the group consisting of styrene-butadiene copolymer, polyvinyl butyral, and combinations thereof.

19 Claims, 1 Drawing Sheet

(56) References Cited

U.S. PATENT DOCUMENTS

| | | |
|---|---|---|
| 6,991,851 B2 | 1/2006 | Krepski et al. |
| 8,263,231 B2 | 9/2012 | Mesa |
| 8,524,825 B2 | 9/2013 | Register et al. |
| 9,273,214 B1 | 3/2016 | Figliozzi |
| 9,909,016 B2 | 3/2018 | Fontaine |
| 10,053,586 B2 | 8/2018 | Fontaine |
| 2010/0068502 A1 | 3/2010 | Kim |
| 2012/0328863 A1 | 12/2012 | Kuo |
| 2017/0226348 A1 | 8/2017 | Gregg et al. |
| 2017/0275476 A1 | 9/2017 | Sarkis et al. |
| 2018/0022931 A1 | 1/2018 | Reimann |
| 2018/0179402 A1 | 6/2018 | Piecha et al. |

FOREIGN PATENT DOCUMENTS

| | | |
|---|---|---|
| EP | 2905085 A1 | 8/2015 |
| EP | 3 207 097 | 8/2017 |
| JP | 2016065216 A | 4/2016 |
| WO | 2008063411 A2 | 5/2008 |
| WO | 2016061058 A1 | 4/2016 |
| WO | 2017028196 A1 | 2/2017 |
| WO | 2017/106207 A1 | 6/2017 |
| WO | 2018067859 A1 | 4/2018 |

OTHER PUBLICATIONS

TRP Polymer Solutions: Ask the Experts—What is Styrene-Butadiene Rubber?, 3 pages (Undated).*

O'Lenick et al, PEG/PPG dimethicone structure and function, Apr. 2013 Personal Care, pp. 1-5 (Year: 2013).*

International Search Report and Written Opinion dated May 12, 2021 for PCT/US2021/015445, 15 pgs.

1st Office Action dated Feb. 3, 2023 for CN Appn. No. 202180024651.2, 6 pgs (Chinese language).

* cited by examiner

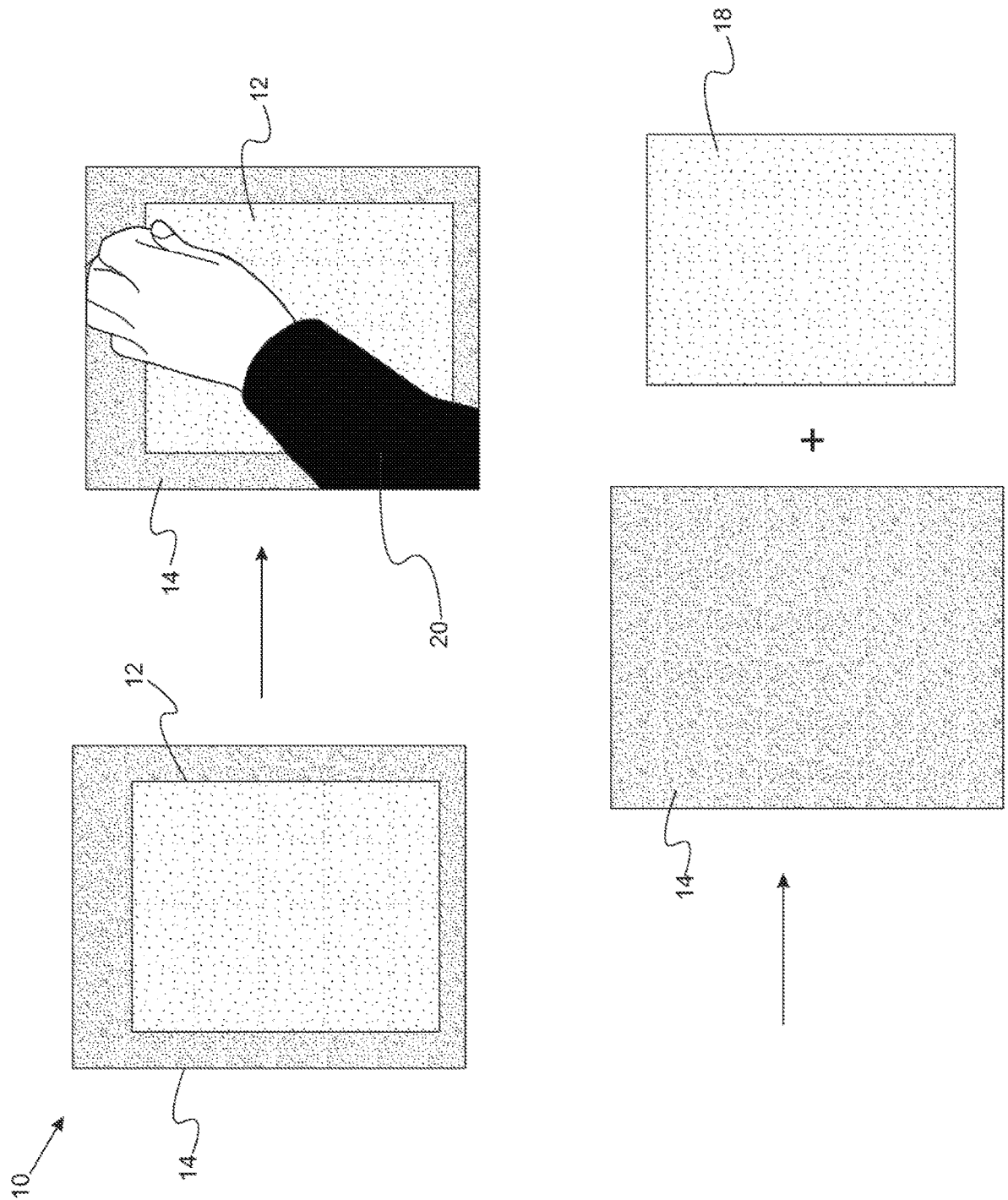

WATER BASED PEELABLE PAINT FOR ARCHITECTURE COATINGS

TECHNICAL FIELD

In at least one aspect, the present invention is related to paint compositions that form peelable coatings on a substrate.

BACKGROUND

Peelable paint compositions allow for a substrate to be coated with a temporary paint coating that can be removed when desired. Some prior art peelable paint compositions deploy a two coats system in which a first coat is applied on the substrate as a sealer with a peelable second coat applied over the first coat can be peelable. Many currently available peelable compositions are solvent-based spray-able paint for automobile coatings for temporary color change.

Accordingly, there is a need for improved low VOC peelable paint compositions that can be used to coat architectural walls.

SUMMARY

In at least one aspect, the present invention provides a peelable paint composition for forming a peelable coating on a substrate. The peelable paint composition includes water, a polyether functional polydimethylsiloxane, or silicone polyether, and a film-forming resin that includes a component selected from the group consisting of styrene-butadiene copolymer, polyvinyl butyral, and combinations thereof. The peelable paint composition can form a film on the pre-painted architectural surface by brushing or rolling. Advantageously, the film adheres well on the substrate and forms a solid film after being dried that can then be peeled manually in large pieces without generating cracks or breaking into small pieces.

In another aspect, the present invention provides a pelable paint composition for forming a peelable coating on a substrate. The peelable paint composition includes water, titanium oxide, a polysiloxane resin, and a film-forming resin that includes a component selected from the group consisting of styrene-butadiene copolymer, polyvinyl butyral, and combinations thereof.

In still another aspect, a method for applying the peelable paint compositions set forth herein is provided. The method includes a step of applying a peelable paint composition to a target substrate to form a coated substrate and allowing the coated substrate to dry.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein:

FIGURE. Schematic flowchart showing the peelability of a paint coating formed by peelable paint compositions.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: in the compounds disclosed herein a CH bond can be substituted with alkyl, lower alkyl, $C_{1-6}$ alkyl, $C_{6-10}$ aryl, $C_{6-10}$ heteroaryl, —$NO_2$, —$NH_2$, —N(R'R"), —N(R'R"R''')$^+$L$^-$, Cl, F, Br, —$CF_3$, —$CCl_3$, —CN, —$SO_3$H, —$PO_3H_2$, —COOH, —$CO_2$R', —COR', —CHO, —OH, —OR', —O$^-$M$^+$, —$SO_3^-$M$^+$, —$PO_3^-$M$^+$, —COO$^-$ M$^+$, —$CF_2$H, —$CF_2$R', —$CFH_2$, and —CFR'R" where R', R" and R''' are $C_{1-10}$ alkyl or $C_{6-18}$ aryl groups; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can betaken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. In the specific examples set forth herein, concentrations, temperature, and reaction conditions (e.g. pressure, pH, etc.) can be practiced with plus or minus 50 percent of the values indicated rounded to three significant figures. In a refinement, concentrations, temperature, and reaction conditions (e.g., pressure, pH, etc.) can be practiced with plus or minus 30 percent of the values indicated rounded to three significant figures of the value provided in the examples. In another refinement, concentrations, temperature, and reaction conditions (e.g., pH, etc.) can be practiced with plus or minus 10 percent of the values indicated rounded to three significant figures of the value provided in the examples.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds named or expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

Throughout this application, where publications are referenced, the disclosures of these publications in their entireties are hereby incorporated by reference into this application to more fully describe the state of the art to which this invention pertains.

The term "shear rate" refers to the rate of change of velocity at which one layer of fluid passes over an adjacent layer.

Abbreviations:
"PPUI" means Premium Plus Ultra Interior.
"BUI" means Behr Ultra Interior
"VOC" means volatile organic compounds.

In an embodiment, a peelable paint composition for forming a peelable coating on a substrate is provided. The peelable paint composition includes water, a polysiloxane resin (e.g., a polyether functional polydimethylsiloxane), and a film-forming resin that includes a component selected from the group consisting of styrene-butadiene copolymer, polyvinyl butyral, and combinations thereof. Characteristically, the peelable paint composition has a low VOC value preferably below 50 g of VOCs per liter of the peelable paint composition. In some refinements, the peelable paint composition includes VOCs in an amount less than, in increasing order of preference, 50 g of VOCs per liter, 40 g of VOCs per liter, 30 g of VOCs per liter, 10 g of VOCs per liter, or 1 g of VOCs per liter.

Advantageously, paint films (i.e., paint coatings) formed from the peelable paint composition adhere well to a multitude of substrates while forming a solid film after curing. As depicted in the FIGURE, a coated substrate 10 includes a peelable film 12 coating a target substrate 14. The paint film 12 can be peeled manually in large pieces 18 by consumer 20 without generating cracks or breaking into small pieces. For the dried coating, consumers can write/draw on it with markers. The peelable paint composition can be tinted and formulated in various sheens from eggshell to semigloss. Applications of the peelable paint composition include, but are not limited to, temporary decoration/color change, color samples provided to customers, surface protection, temporary decorative art, and as a replacement for taping and painting. For example, a tenant can paint an apartment with any desired color that can be removed at a later date. In another example, a painted substrate can be cut and sections removed. In another example, the painted substrate can provide a removable substrate for artistic works and writing.

In a variation, the weight ratio of film forming resin to the polysiloxane resin is from about 5:1 to 40:1. In some refinements, the weight ratio of film forming resin to the polysiloxane resin is at least, in increasing order of preference, 3:1, 4:1, 5:1, 6:1, 7:1, 8:1, 9:1, or 10:1. In further refinements, the weight ratio of film forming resin to the polysiloxane resin is at most, in increasing order of preference, 50:1, 40:1, 30:1, 25:1, 20:1, 18:1, 15:1, or 12:1.

As set forth above, the film-forming resin can include a styrene-butadiene copolymer. In a refinement, the styrene-butadiene copolymer is a random copolymer of about 50 to 85 weight percent butadiene and about 50 to 15 weight percent styrene. In a further refinement, the styrene-butadiene copolymer is a random copolymer of about 70 to 80 weight percent butadiene and about 30 to 20 weight percent styrene As set forth above, the peelable paint composition includes a polysiloxane resin. Typically, the polysiloxane resin is a reactive polysiloxane resin. Moreover, the polysiloxane resin can be a nonionic, solvent-free, water-dilutable emulsion of a reactive polysiloxane. In this regard, the polysiloxane resin can be completely miscible with water. In a refinement, the polysiloxane resin can include polysiloxane with functional groups and polyglycol ether groups (e.g., a polyether functional polydimethylsiloxane). Examples of such functional groups attached to a polysiloxane moiety are amino, hydroxyl, carboxylate, carbamate, halo (e.g., Cl, Br, etc.) and the like. Moreover, the functional group can be separated from the polysiloxane moiety by a $C_{1-20}$ alkyl group (formally referred to as a dialkylenyl group or radical). In a specific example, the polysiloxane resin includes a polyether functional polydimethylsiloxane or an organosiloxanyl with polyalkylene glycol. Advantageously, the polysiloxane resin induces the smoothness on top surface and further reduces adhesion on substrate, which fixes the tackiness on top surface and further weakens the adhesion on substrate for the dried film.

In a variation, the polysiloxane resin is present in an amount from about 1 to 20 weight percent of the total peelable paint composition and the film-forming resin is present in an amount from about 50 to 75 weight percent of the total peelable paint composition. Typically, the balance includes one or more paint additives and water.

In some variations, the one or more paint additives are selected from the group consisting of pigment extenders, matting agents, rheology modifiers, surfactants, defoamers, organic solvents, pH adjusters, UV stabilizers, dispersants (e.g., pigment dispersants), coalescents, biocides, matting agents, opaque polymers, thickeners, mildewcides, and the like, and combinations thereof. It should be appreciated that any combination of these paint additives can be used. In should also be appreciated that each specific additive may refer to a combination of such additives. Typically, each paint additives is independently present in an amount from about 0.01 to 10 weight percent of the total weight of the peelable paint composition. In some refinements, each paint additives is independently present in an amount of at least, 0.01, 0.1, 0.5, 1, 2, 3, 4, or 5 and at most 20, 15, 13, 12, 10, 9, 7, or 6 weight percent of the total weight of the peelable paint composition.

The one or more paint additives impart a number of useful properties to the peelable paint composition. For example, the peelable paint composition can include a low shear rheology modifier and a high shear rheology modifier. The rheology provide the desired application performance for the wet paint during rolling and brushing. For the eggshell formula, the pigment extender lowers the sheen. Surfactant offers surface wetting performance and defoamer removes foams after application.

In another variation, the peelable paint composition includes titanium oxide (i.e., $TiO_2$). Advantageously, the titanium oxides provide a scattering effect for hiding. In a variation, the titanium oxide is present in an amount from about 3 to 15 weight percent of the total weight of the peelable paint composition.

In another embodiment, a method for applying the peelable paint compositions set forth above is provided. The method includes a step of applying a peelable paint composition to a target substrate (e.g., architectural walls) to form a coated substrate and allowing the coated substrate to dry. It should be appreciated that the present embodiment is not limited by the method of applying the peelable paint composition. For example, the peelable paint composition can be allowed by such methods as application with a paint roller, application with a paintbrush, and by spraying. The paint formulation can be applied to surfaces coated with premium paints such as Behr's BUI white flat 1750, white semigloss 3750, Marquee white flat 1450, deep flat 1453, medium satin 7754, white semigloss 3450 and deep semigloss 3453. After drying, the coating has good adhesion on the substrate that it will not fall apart by itself unless it is peeled manually. When peeled, the coating has good tensile strength such at the paint coating will not crack and a large continuous piece of film is pulled away from the surface without break. (see the FIGURE described above).

The following examples illustrate the various embodiments of the present invention. Those skilled in the art will recognize many variations that are within the spirit of the present invention and scope of the claims.

Exemplary formulas of eggshell and semigloss white paint formulations are provided in Tables 1 and 2. The styrene-budadiene emulsion resin offers weakened adhesion towards painted substrate to make the film peelable from substrate, and strong tensile strength so the paint film can be peeled in large pieces not forming cracks or breaking into small pieces.

TABLE 1

Peelable Paint formulations.

| Formula | Eggshell White formula (parts by weight) | Semigloss White formula (parts by weight) |
|---|---|---|
| styrene-butadiene resin | 52-56 | 62-66 |
| polysiloxane resin | 4.5-6.5 | 8-10 |
| $TiO_2$ Slurry (76 wt %) | 10-11 | 5-6 |
| Water | 17-19.5 | 14.5-17 |
| High Shear Rheology Modifier | 1.5-3 | 1.5-3 |
| Coalescent Agent | 1.5-2.5 | 1.5-2.5 |
| Wetting Agent | 0.5-1 | 0.5-1 |
| Mildewcide | 0.5-1 | 0.5-1 |
| Defoamer | 0.1-0.5 | 0.5-0.9 |
| Low Shear Rheology Modifier | 0.5-1 | 0.1-0.5 |
| Other Additives | 0.1-0.3 | 0.1-0.3 |
| Pigment extender | 4-6 | — |

TABLE 2

Peelable Paint formulations.

| Formula | Eggshell White formula (parts by weight) |
|---|---|
| Water | 148.93 |
| $TiO_2$ Slurry (76 wt %)) | 95 |
| multifunctional surfactant | 2 |
| polysiloxane resin | 17.00 |
| AMP 75 | 2 |
| defoamer | 1.5 |
| Polyvinyl butyral ~~(what is the percent solids)~~ | 544 |
| Coalescent Agent | 16 |
| high shear rheology | 25.00 |
| Low shear rheology | 10 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A peelable paint composition for forming a peelable coating on a substrate, the peelable paint composition comprising:
   a polysiloxane resin that includes polysiloxane with functional groups and polyglycol ether groups;
   a film-forming resin that includes a component selected from the group consisting of styrene-butadiene copolymer, polyvinyl butyral, and combinations thereof; and
   water.

2. The peelable paint composition of claim 1, wherein a weight ratio of the film-forming resin to the polysiloxane resin is from 5:1 to 40:1.

3. The peelable paint composition of claim 1, wherein a weight ratio of the film-forming resin to the polysiloxane resin is from 8:1 to 15:1.

4. The peelable paint composition of claim 1, wherein the film-forming resin includes a styrene-butadiene copolymer.

5. The peelable paint composition of claim 1, wherein the styrene-butadiene copolymer is a random copolymer of about 50 to 85 weight percent butadiene and about 50 to 15 weight percent styrene.

6. The peelable paint composition of claim 1, wherein the styrene-butadiene copolymer is a random copolymer of about 70 to 80 weight percent butadiene and about 30 to 20 weight percent styrene.

7. The peelable paint composition of claim 1, wherein the polysiloxane resin includes a polyether functional polydimethylsiloxane.

8. The peelable paint composition of claim 1, wherein:
    the polysiloxane resin is present in an amount from about 1 to 20 weight percent of the total peelable paint composition; and
    the film-forming resin is present in an amount from about 50 to 75 weight percent of the total peelable paint composition,
    with the balance being one or more paint additives and water.

9. The peelable paint composition of claim 8, wherein the one or more paint additives are selected from the group consisting of titanium oxide, pigment extenders, matting agents, rheology modifiers, surfactants, defoamers, organic solvents, pH adjusters, UV stabilizers, dispersants, coalescents, biocides, opaque polymers, thickeners, mildewcides, and combinations thereof.

10. A peelable paint composition for forming a peelable coating on a substrate, the peelable paint composition comprising:
    a reactive polysiloxane resin that is completely miscible with water;
    a film-forming resin that includes a component selected from the group consisting of styrene-butadiene copolymer, polyvinyl butyral, and combinations thereof;
    titanium oxide; and
    water.

11. The peelable paint composition of claim 10, wherein the weight ratio of the film-forming resin to the polysiloxane resin is from 5:1 to 40:1.

12. The peelable paint composition of claim 10, wherein the film-forming resin includes a styrene-butadiene copolymer.

13. The peelable paint composition of claim 10 wherein the reactive polysiloxane resin includes a polyether functional polydimethylsiloxane.

14. The peelable paint composition of claim 10 wherein the reactive polysiloxane resin includes polysiloxane with functional groups and polyglycol ether groups.

15. The peelable paint composition of claim 10, wherein:
    the reactive polysiloxane resin is present in an amount from about 1 to 20 weight percent of the total peelable paint composition; and
    the film-forming resin is present in an amount from about 50 to 75 weight percent of the total peelable paint composition; and
    titanium oxide is present in an amount of 3 to 15 weight percent of the total peelable paint composition,
    with the balance being one or more paint additives and water.

16. The peelable paint composition of claim 15, wherein the one or more paint additives are selected from the group consisting of pigment extenders, matting agents, rheology modifiers, surfactants, defoamers, organic solvents, pH adjusters, UV stabilizers, dispersants, coalescents, biocides, opaque polymers, thickeners, mildewcides, and combinations thereof.

17. A peelable paint composition for forming a peelable coating on a substrate, the peelable paint composition comprising:
    a polysiloxane resin that includes a polyether functional polydimethylsiloxane or an organosiloxanyl with polyalkylene glycol;
    a film-forming resin that includes styrene-butadiene copolymer; and
    water.

18. The peelable paint composition of claim 17, wherein the weight ratio of the film-forming resin to the polysiloxane resin is from 5:1 to 40:1.

19. The peelable paint composition of claim 17 further comprising titanium oxide.

* * * * *